O. FARRA.

Improvement in Hemp-Harvesters.

No. 5,142. Reissued Nov. 12, 1872.

Witnesses.
S. C. Allen
L. P. Freund

Inventor
Oliver Farra.
By James L. Norris.
Atty.

AM. PHOTO-LITHOGRAPHIC CO. N.Y. (OSBORNE'S PROCESS.)

UNITED STATES PATENT OFFICE.

OLIVER FARRA, OF JESSAMINE COUNTY, KENTUCKY, ASSIGNOR TO JAMES A. FARRA.

IMPROVEMENT IN HEMP-HARVESTERS.

Specification forming part of Letters Patent No. 126,793, dated May 14, 1872; reissue No. 5,142, dated November 12, 1872.

*To all whom it may concern:*

Be it known that I, OLIVER FARRA, of the county of Jessamine and State of Kentucky, have invented certain new and useful Improvements in Mowing-Machines; and I do hereby declare the following to be a full, clear, and exact description thereof, reference being had to the accompanying drawing and to the letters of reference marked thereon.

The nature of my invention consists in the construction and arrangement of an attachment for hemp-harvesters, whereby hemp, grain, &c., may be cut with great facility and accuracy, raked, and deposited in bundles of any desired size.

In order to enable others skilled in the art to which my invention appertains to make and use the same, I will now proceed to describe its construction and operation, referring to the annexed drawing which forms a part of this specification, and in which—

Figure 1:
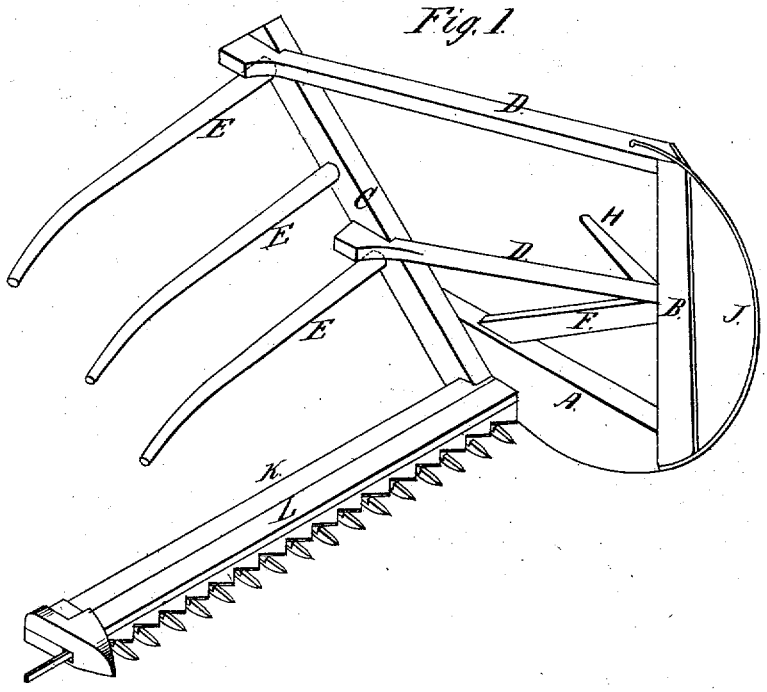
Figure 2:
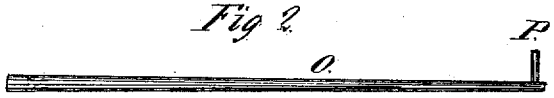

Figure 1 is a perspective view of the attachment, and Fig. 2 is a side view of the rake.

A represents the bottom part of the frame constituting my attachment, which is firmly secured to the dividing piece of the sickle-bar L, and has its front and rear ends rounded so as to run with ease over the ground. At the front end of the bar A, which is some distance in advance of the sickle, is an upright, B, the front edge of which is V-shaped and provided with an elevated divider, curved or pointed, and having its entering-point raised to divide and separate the hemp about midway of the stalks. This separator should extend sufficiently high to thoroughly divide the stalks from some distance above the ground to near their headings, and not merely at or very near the roots of the hemp, as has been heretofore the case with machines for the same purpose. At the rear end of the bar A is another upright, C, which inclines backward and inward, and is connected with the front upright B by means of horizontal bars D D. These bars are, preferably, wider at their rear ends, and curved, as shown, so as to facilitate the delivery of the hemp or grain onto the receiving-arms E E, which are framed into the rear upright C, and sustain the hemp, &c., in an upright position, which enables the raker to deliver the same much more easily than when laid down upon or inclining upon a platform. The arms E E, it will be seen, are in line with the back edge of the sickle-bar, but inclined to its top face, drooping at their points, so as to offer the least friction or resistance to the delivery of the hemp or grain. These points are also curved forward so as to hold the hemp in position until it is desired to drop the same. The bar A and upright B may be more firmly secured by a brace, F, and to said upright is secured an arm, H, standing at an angle to relieve the connecting-bars D D from the pressure of the uncut hemp, &c. To the rear edge of the sickle-bar L is secured a plank, K, or sheet-metal plate, to increase the width of said sickle-bar so as to receive and sustain the hemp, &c., upon the butt ends until a bundle is cut. O is a handle with hook, P, forming a rake for raking the hemp, &c., from the arms E E. The driver, or an assistant, having in his hands the rake O P, when the mower is started throws the rake forward of the arms E so as to inclose a sufficient amount of hemp or grain to make the desired-sized bundle, and, when he sees that all of the same has been cut by the sickle, he immediately draws the rake toward him, and thereby draws the top of the hemp or grain. The lower ends, remaining on the sickle-bar, enable him to tilt the hemp down on the ground, where it is left by the machine. The man with the rake then proceeds to perform a similar and continuous operation to the one just described, which is performed with great facility and success by persons of common observation and experience.

Having thus fully described my invention, what I claim as new, and desire to secure by Letters Patent, is—

1. An elevated divider forward of the cutter, having the entering point raised to divide and separate the hemp about midway of the stalks, substantially as described.

2. The combination of the fingers E, horizontal plate K, and elevated divider, substantially as described, whereby the cut hemp is sustained in an upright position until delivered into bunches by a raker, as set forth.

OLIVER FARRA.

Witnesses:
D. S. COLEMAN,
JNO. MASON BROWN.